United States Patent
Libenzi et al.

(10) Patent No.: US 6,993,660 B1
(45) Date of Patent: Jan. 31, 2006

(54) SYSTEM AND METHOD FOR PERFORMING EFFICIENT COMPUTER VIRUS SCANNING OF TRANSIENT MESSAGES USING CHECKSUMS IN A DISTRIBUTED COMPUTING ENVIRONMENT

(75) Inventors: Davide Libenzi, Hillsboro, OR (US); Michael Chin-Hwan Pak, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 858 days.

(21) Appl. No.: 10/016,533

(22) Filed: Dec. 10, 2001

Related U.S. Application Data

(60) Provisional application No. 60/309,858, filed on Aug. 3, 2001, provisional application No. 60/309,835, filed on Aug. 3, 2001.

(51) Int. Cl.
*G06F 11/30* (2006.01)
*G06F 12/14* (2006.01)
*H04L 9/32* (2006.01)

(52) U.S. Cl. ............... 713/188; 726/24; 726/23
(58) Field of Classification Search ........ 713/188; 709/206, 232; 726/23, 24
See application file for complete search history.

(56) References Cited

U.S. PATENT DOCUMENTS

| | | | | |
|---|---|---|---|---|
| 5,832,208 A | * | 11/1998 | Chen et al. | 713/201 |
| 6,021,510 A | * | 2/2000 | Nachenberg | 714/38 |
| 6,094,731 A | * | 7/2000 | Waldin et al. | 714/38 |
| 6,119,231 A | | 9/2000 | Foss et al. | |
| 6,577,920 B1 | * | 6/2003 | Hypponen et al. | 700/200 |
| 6,732,149 B1 | * | 5/2004 | Kephart | 709/206 |
| 6,745,192 B1 | | 6/2004 | Libenzi | 707/100 |
| 6,851,057 B1 | * | 2/2005 | Nachenberg | 713/200 |
| 2002/0016826 A1 | | 2/2002 | Johansson et al. | 709/207 |
| 2004/0236884 A1 | * | 11/2004 | Beetz | 710/68 |

OTHER PUBLICATIONS

"Virus Information Library," http://vi.mcafee.com; Networks Associates, Inc., 2001.
Stephens W R, "SMTP: Simple Mail Transfer Protocol," *TCP/IP Illustrated: The Protocols*; vol. 1, Ch. 28, pp. 441-459, 1999, Addison-Wesley, USA.
U.S. Appl. No. 10/016,509, filed Dec. 10, 2001.

* cited by examiner

*Primary Examiner*—Gilberto Barrón, Jr.
*Assistant Examiner*—Samson Lemma
(74) *Attorney, Agent, or Firm*—Zilka-Kotab, PC; Christopher J. Hamaty

(57) ABSTRACT

A system and method for performing efficient computer virus scanning of transient messages using checksums in a distributed computing environment is described. An incoming message is intercepted at a network domain boundary. The incoming message includes a body storing message content. The message content is parsed from the body and a checksum is calculated over the parsed message content. The checksum is stored in an information file associated with the incoming message in a transient message store. The incoming message is scanned for a presence of at least one of a computer virus and malware to identify infected message contents. The checksum corresponding to each infected message content and an infection indicator is recorded.

40 Claims, 8 Drawing Sheets

SYSTEM AND METHOD FOR PERFORMING EFFICIENT COMPUTER VIRUS SCANNING OF TRANSIENT MESSAGES USING CHECKSUMS IN A DISTRIBUTED COMPUTING ENVIRONMENT

CROSS-REFERENCE TO RELATED APPLICATIONS

This patent application is a conversion of U.S. provisional patent applications, Ser. No. 60/309,835, filed Aug. 3, 2001, pending; and Ser. No. 60/309,858, filed Aug. 3, 2001, pending; the priority dates of which are claimed and the disclosures of which are incorporated by reference.

FIELD OF THE INVENTION

The present invention relates in general to dynamic message scanning and, in particular, to a system and method for performing efficient computer virus scanning of transient messages using checksums in a distributed computing environment.

BACKGROUND OF THE INVENTION

Computer viruses, or simply "viruses," are executable programs or procedures, often masquerading as legitimate files, messages or attachments that cause malicious and sometimes destructive results. More precisely, computer viruses include any form of self-replicating computer code which can be stored, disseminated, and directly or indirectly executed by unsuspecting clients. Viruses travel between machines over network connections or via infected media and can be executable code disguised as application programs, functions, macros, electronic mail (email) attachments, images, applets, and even hypertext links.

The earliest computer viruses infected boot sectors and files. Over time, computer viruses became increasingly sophisticated and diversified into various genre, including cavity, cluster, companion, direct action, encrypting, multi-partite, mutating, polymorphic, overwriting, self-garbling, and stealth viruses, such as described in "Virus Information Library," http://vil.mcafee.com/default.asp?, Networks Associates Technology, Inc., (2001), the disclosure of which is incorporated by reference. Macro viruses are presently the most popular form of virus. These viruses are written as scripts in macro programming languages, which are often included with email as innocuous-looking attachments.

The problems presented by computer viruses, malware, and other forms of bad content are multiplied within a bounded network domain interfacing to external internetworks through a limited-bandwidth service portal, such as a gateway, bridge or similar routing device. The routing device logically forms a protected enclave within which clients and servers exchange data, including email and other content. All data originating from or being sent to systems outside the network domain must pass through the routing device. Maintaining high throughput at the routing device is paramount to optimal network performance.

Routing devices provide an efficient solution to interfacing an intranetwork of clients and servers to external internetworks. Most routing devices operate as store-and-forward packet routing devices, which can process a high volume of traffic transiting across the network domain boundary. Duplicate messages, however, introduce inefficiencies and can potentially degrade performance. For example, a message can be sent with multiple recipients who each receive a separate copy. Nevertheless, the routing device must process each duplicate message as if the message were unique.

A firewall can be used with a routing device to provide limited security. The firewall filters incoming packets to deny access by unauthorized users. Thus, the firewall can protect indirectly against the introduction of computer viruses and other malware into a network domain. As each duplicate message must still be scanned prior to delivery, a firewall does not relieve packet congestion at a network boundary and can actually degrade throughput by delaying delivery.

The bottleneck created by the routing device and firewall create a security risk that can be exploited in a denial of service (DoS) attack. The "ILOVEYOU" virus, released in May 2000, dramatically demonstrated the vulnerability of network infrastructure components by propagating copies of emails containing the virus using addresses obtained from a user address book on each client system. Each email message contained identical content but listed a different recipient. The resultant email flood saturated servers with massively duplicated copies of substantially the same email and denied service through resource depletion and network bandwidth consumption.

Most firewalls failed to detect the presence of the "ILOVEYOU" virus. Firewalls require a priori knowledge of network addresses corresponding to proscribed servers to effectively filter out potentially bad packets. Therefore, infected emails were delivered and unwittingly opened by unsuspecting users, creating a flood of infected message traffic.

Packet screening devices can effectively block copies of massively duplicated email by detecting readily-discoverable characteristics in message headers indicative of an infected message. Packet screening can be readily bypassed by altering the message headers and by attaching or embedding virus payloads to otherwise clean emails. Antivirus scanners can still detect such altered messages. However, the contents of each screened email must still be separately scanned, potentially resulting in duplicate email scanning.

Therefore, there is a need for an approach to efficiently scanning a multiplicity of substantially duplicate message packets transiting the boundary of a network domain. Such an approach would preferably decrease duplicate antivirus scanning by recognizing message packet contents that were previously identified as being infected.

There is a further need for an approach to scanning transient messages at in conjunction with message packet screener. Preferably, such an approach recognize previously-identified infected message content and would decrease the load on the antivirus scanner. Such an approach would further provide pro-active antivirus measures, including packet discarding and early connection closure.

SUMMARY OF THE INVENTION

The present invention provides a system and method for efficiently detecting a computer virus, malware or other bad content in a transient message packet. Each incoming message packet is intercepted and parsed. A checksum is calculated from the message body and any attachments, including embedded attachments, and is stored in an information file associated with the message packet. If the checksum matches any previously-stored checksum corresponding to an infected message body or attachment, the message is discarded. Otherwise, the message body and any attachments are scanned. If infected, a record in a checksum table storing each checksum is updated with an infection indicator and the message is discarded. Otherwise, the message is forwarded.

An embodiment of the present invention provides a system and a method for performing efficient computer virus scanning of transient messages using checksums in a distributed computing environment. An incoming message is intercepted at a network domain boundary. The incoming message includes a body storing message content. The message content is parsed from the body and a checksum is calculated over the parsed message content. The checksum is stored in an information file associated with the incoming message in a transient message store. The incoming message is scanned for a presence of at least one of a computer virus and malware to identify infected message contents. The checksum corresponding to each infected message content and an infection indicator is recorded.

A further embodiment provides a system and method for performing efficient computer virus scanning of transient messages with message digests. An incoming message is intercepted at a network domain boundary. The incoming message includes a header including fields, which each store field values, and a body storing message content. The field values are parsed from each field in the header and the message content from the body. A message digest is generated over each such field value and over the message content. The message digests corresponding to the incoming message are recorded. The incoming message is scanned for a presence of at least one of a computer virus and malware to identify infected message contents. The message digest corresponding to each infected message content is updated with an infection indicator.

A further embodiment provides a system and method for providing dynamic computer virus and malware protection of message packets in a bounded network domain. An incoming message packet is intercepted. Each incoming message packet includes a plurality of sections having a header storing field values and a body storing message packet content. Dynamic computer virus and malware protection is provided by at least one of a checksum calculation or digest generation. A checksum is calculated over the message packet content stored in the body of the incoming message packet. A digest is generated over at least one the field values stored in the header and the message packet content stored in the body of the incoming message packet. At least one of the checksum and the digest is stored. The incoming message packet is scanned if the at least one of the checksum and the digest have not been previously stored with an infection indicator indicating a presence of at least one of a computer virus and malware.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
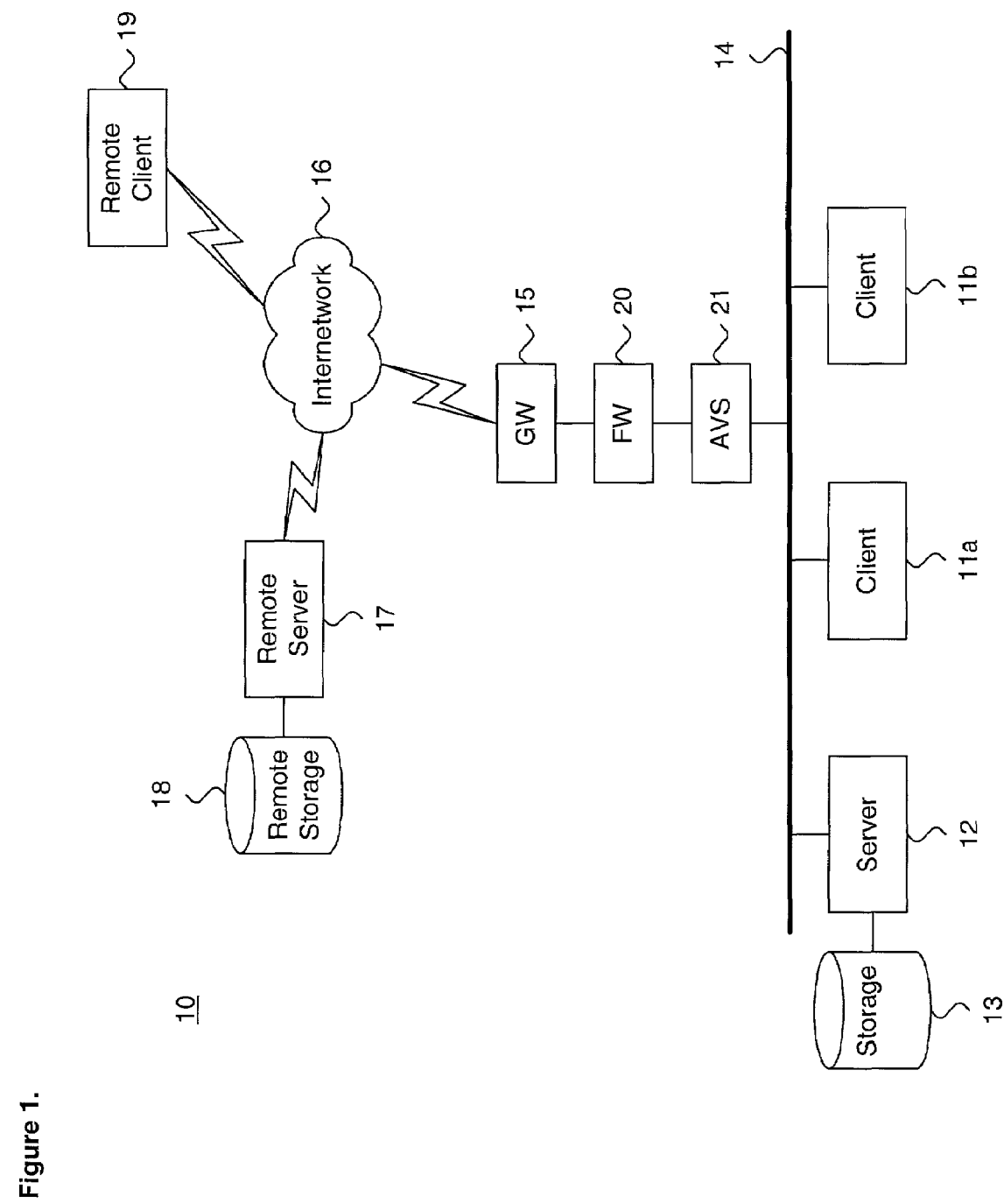
FIG. 1 is a block diagram showing a system for performing efficient computer virus scanning of transient messages using checksums in a distributed computing environment, in accordance with the present invention.

FIG. 1 is a block diagram showing a system for performing efficient computer virus scanning of transient messages using checksums in a distributed computing environment 10, in accordance with the present invention. By way of example, a gateway 15 (or bridge, router, or similar packet routing device) interfaces an intranetwork 14 to an internetwork 16, including the Internet. The intranetwork 14 interconnects one or more servers 12 with one or more clients 11a–b within a bounded network domain defined by a common network address space. The server 12 includes a storage device 13 for common file storage and sharing. The clients 11a–b can also include storage devices (not shown).

The individual servers 12 and clients 11a–b externally connect to one or more remote servers 17 and remote clients 19 over the internetwork 16 via the gateway 15. The gateway 15 operates as a store-and-forward packet routing device, which processes a high volume of packet traffic transiting across the network domain boundary. The gateway 15 provides an efficient solution to interfacing the individual servers 12 and clients 11a–b to external systems operating over the internetwork 16. Optionally, a firewall 20 can provide limited security to the intranetwork 14 by providing filtering of packets originating from unauthorized users. Other network topologies and configurations are feasible, as would be recognized by one skilled in the art.

In addition to the firewall 20, an antivirus system (AVS) 21 actively analyzes message packets incoming to the bounded network domain for the presence of computer viruses and provides dynamic scanning of transient messages using checksums, as further described below with reference to FIG. 2. Each component in the distributed computing environment 10 executes a layered network protocol stack for processing different types of packets, including electronic mail (email) exchanged in accordance with the Simple Mail Transport Protocol (SMTP). In the described embodiment, the system and method are implemented in the Web Shield E500 ASAP active security antivirus product, Version 1.0, licensed by Network Associates, Inc., Santa Clara, Calif.

The individual computer systems, including servers 12, 17 and clients 11a–b, 19 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
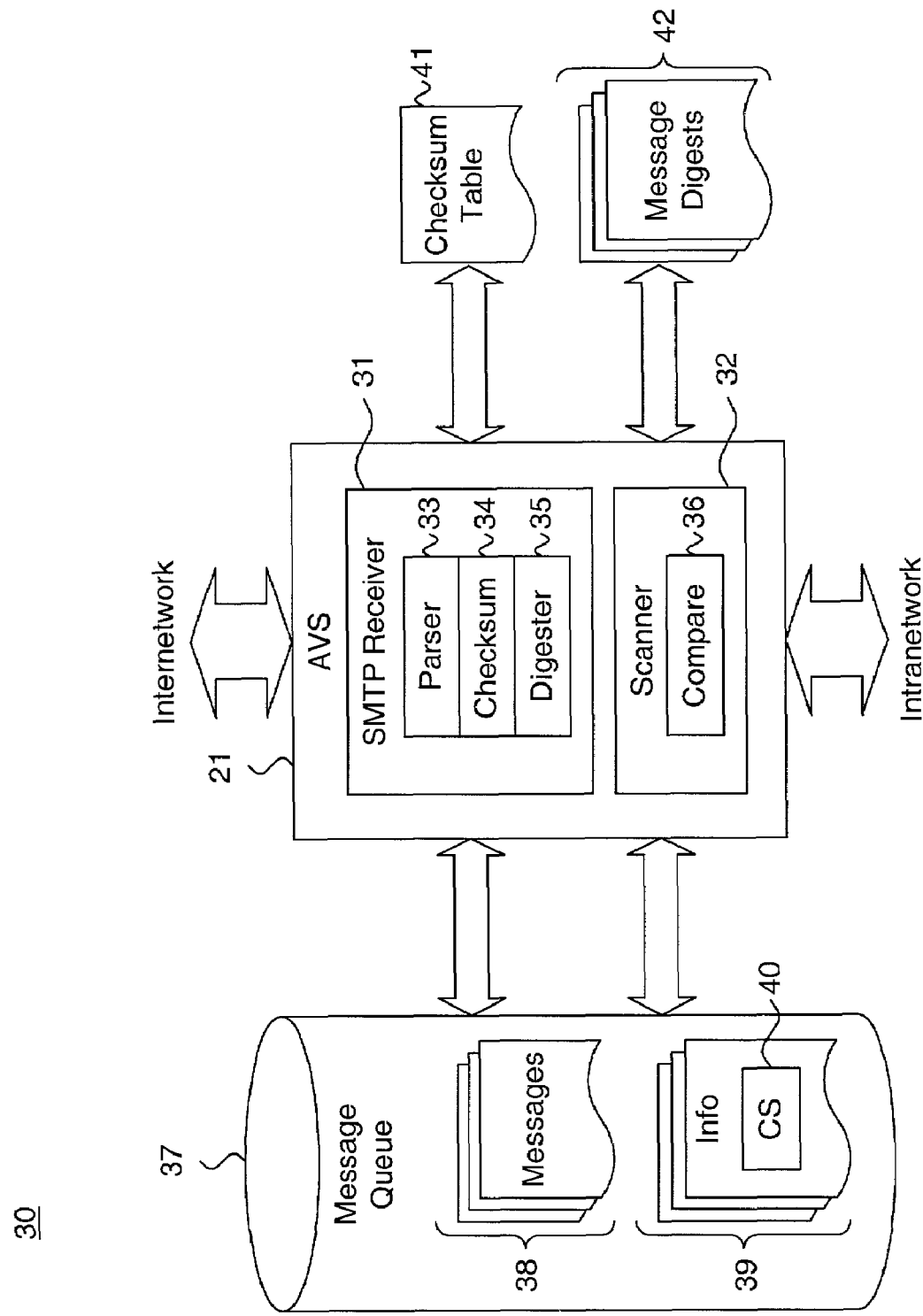
FIG. 2 is a functional block diagram showing the software modules of the antivirus system of FIG. 1.

FIG. 2 is a functional block diagram showing the software modules 30 of the antivirus system 21 of FIG. 1. The antivirus system 21 includes two functionally separate modules: SMTP receiver 31 and antivirus scanner 32. The SMTP receiver 31 intercepts and screens transient message packets, preferably exchanged in compliance with the SMTP protocol, such as described in W. R Stevens, "TCP/IP Illustrated, Vol. 1, The Protocols," Ch. 28, Addison Wesley Longman, Inc. (1994), the disclosure of which is incorporated by reference. The fields in each message packet header are screened for indications that the accompanying contents of the message contain a virus, malware or other form of bad content, such as described in commonly-assigned related U.S. Pat. application Ser. No. 10/016,509, entitled "System And Method For Providing Dynamic Screening Of Transient Messages In A Distributed Computing Environment," filed Dec. 10, 2001, pending, the disclosure of which is incorporated by reference. For example, a subject field in a header containing the string "Check this out" would signal an infected message when intercepted by the SMTP receiver 31 along with other similar messages confirmed to be infected. Only screened "clean" messages 38 are forwarded on the antivirus scanner 32.

The SMTP receiver 31 and antivirus scanner 32 are functionally separate modules. The SMTP receiver 31 operates on the contents of message header fields. The antivirus scanner 32 operates on the actual contents of the message body and any attachments, including embedded attachments. The antivirus scanner 32 retrieves each screened message from a message queue 37 for scanning using standard antivirus techniques, as are known in the art.

The antivirus scanner 32 operates in an event-based manner by processing screened messages fed into the message queue 37 by the SMTP receiver 31. The message queue 37 functions as an event-handler by creating a logical connection between the SMTP receiver 31 and antivirus scanner 32. The message queue 37 provides an intermediate store in which screened messages 38 are staged. In the described embodiment, the screened messages 38 are efficiently staged in a hierarchical message store implementing a portable message referencing scheme, such as described in commonly-assigned related U.S. Pat. No. 6,745,192, entitled "System And Method For Providing A Multi-Tiered Hierarchical Transient Message Store Accessed Using Multiply Hashed Unique Filenames," filed Dec. 10, 2001, the disclosure of which is incorporated by reference.

The antivirus scanner 32 can fall behind in processing if the message queue 37 becomes saturated with screened messages 38. Consequently, the antivirus system 21 will hinder packet throughput and create a bottleneck into the network domain. As the SMTP receiver 31 can process transient messages at a higher rate than the antivirus scanner 32, the SMTP receiver 31 works closely in conjunction with the SMTP receiver 31 to maintain the message queue 37 at a constant size in pace with the antivirus scanner 32 and to prevent the message queue 37 from becoming saturated by screened messages 38 awaiting scanning.

Incoming transient messages are received from the internetwork 16. The SMTP receiver 31 includes three modules: parser 33, checksum 34 and digester 35. The parser 33 interprets the body of each message and any attachments, including embedded attachments, as the message is received. The checksum 34 calculates a running line-by-line checksum (CS) 40 over the message body and each attachment. In a further embodiment, the digester 35 generates message digests 43 over select parts of each message header, body and attachment. Following checksum calculation, the SMTP receiver 31 stores the checksum 40 in an information file (Info) 39. Each information file 39 is stored in the message queue 37 with the associated screened message 38.

The SMTP receiver 31 provides a first stage of protection by recognizing readily-discoverable characteristics indicative of an infected message appearing in packet header fields. The antivirus scanner 32 presents a second stage by scanning the body of each screened message 38 and any attachments, including embedded attachments, for viruses, malware and other bad content. If a screened message 38 is infected, the antivirus scanner 32 stores an infection marker, in the form of the checksum corresponding to the infected body or attachment, in a checksum table 41.

The antivirus scanner 32 includes a compare module 36 that compares the checksum 40 of the body and any attachments of each subsequently screened messages 38 to those checksums 40 stored in the checksum table 41. The antivirus scanner 32 records an infection marker into the checksum table 41 for each checksum 40 corresponding to an infected message body or attachment. Upon receiving subsequent incoming screened messages 38, if the checksums match, the screened message is pro-actively blocked and discarded, thereby avoiding unnecessary and time-consuming scanning by the antivirus scanner 32. Otherwise, if no matching checksums are found in the checksum table 41, the screened message 38 is scanned for viruses, malware and other bad content.

Each module, including SMTP receiver 31 and antivirus scanner 32, is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The modules operates in accordance with a sequence of process steps, as further described below with reference to FIG. 5.

Figure 3:
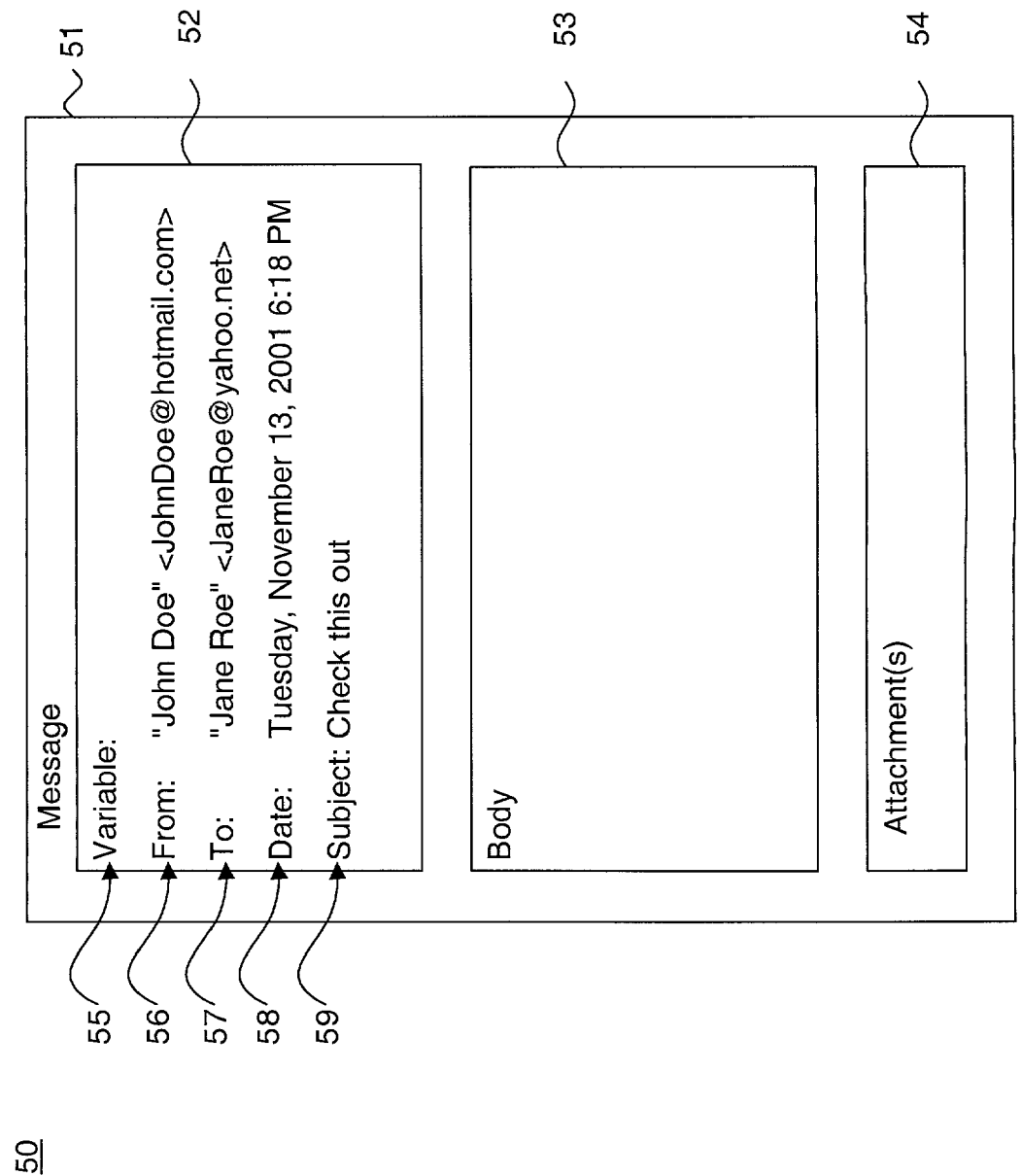
FIG. 3 is a data structure diagram showing, by way of example, the logical layout of a Simple Mail Transfer Protocol (SMTP) message for processing by the antivirus system of FIG. 1.

FIG. 3 is a data structure diagram showing, by way of example, the logical layout 50 of a Simple Mail Transfer Protocol (SMTP) message 51 for processing by the antivirus system 21 of FIG. 1. Note that while transient messages are exchanged using SMTP, the content of each message is formatted according to the Multipurpose Internet Mail Extensions (MIME) standard. Accordingly, each message 51 includes two mandatory sections, a header 52 and body 53, plus one or more optional attachments 54, including embedded attachments (not shown). Each header 52 includes several structured fields, including Variable field 55, From field 56, To field 57, Date field 58, and Subject field 59. Other fields are possible, as would be recognized by one skilled in the art. The foregoing list of fields 55–59 is merely illustrative for purposes of describing the operations performed by the parser 33 (shown in FIG. 2).

As each incoming SMTP message 51 is received, the individual fields 55–59 are parsed by the parser 33, which will block the message 51 from entering the message queue 37 if a blocking rule 37 is matched. Each blocked message is discarded and the connection is closed. If no blocking rules 37 match, the message header is "clean" and the SMTP receiver 31 calculates a checksum 40 over the body 53 and any attachments 54, including embedded attachments. The checksums 40 are stored in an information file 39 associated with each screened message 38.

In the described embodiment, a checksum 40 is calculated over each message body 53 and attachment 54 on a line-by-line basis, such as described by the following pseudocode:

```
unsigned int    s[MAXSIZE];
for each line, do {
    for (i=0; s[i] != '/0'; i++) {
        c = (c << 5 | s[i]);
}
```

EXAMPLE 1

Sample Checksum Pseudocode where the current line is stored in the array s and c is the checksum 40. Other methods of calculating a checksum are feasible, as would be recognized by one skilled in the art.

Alternatively, in a further embodiment, message digests 42 of the relevant portion of fields 55–59 of the header 52, message body 53 and any attachments 54 are generated using standard hashing approaches, such as SHA-1 and MD5. Hashing select portions of screened messages 51 allows additional pre-filtering by the antivirus scanner 32, which compares the message digests of incoming messages to the stored message digests 42. If the message digests match, the message is discarded. If no match is found, the message is scanned and, if infected, the stored message digest 42 is updated to include an infection indication.

A hash is generated over only those infectable parts of each message 51. The infectable parts include the subject field 59 of the message header 52, body 53 and any attachments 54. As well, certain parts of a message body 53 can be separately infectable by a virus, such as might be the case with an executable message 51. For example, a message written in the hypertext markup language (HTML) includes scripted and non-scripted parts. The scripted parts represent potentially infectable content and only those parts of the script identified by script tags would be hashed. A similar approach can be taken to hash macro scripts, such as commonly used for word processors and spreadsheets, such as the Microsoft Word and Excel products, licensed by Microsoft Corporation, Redmond, Wash.

Figure 4:
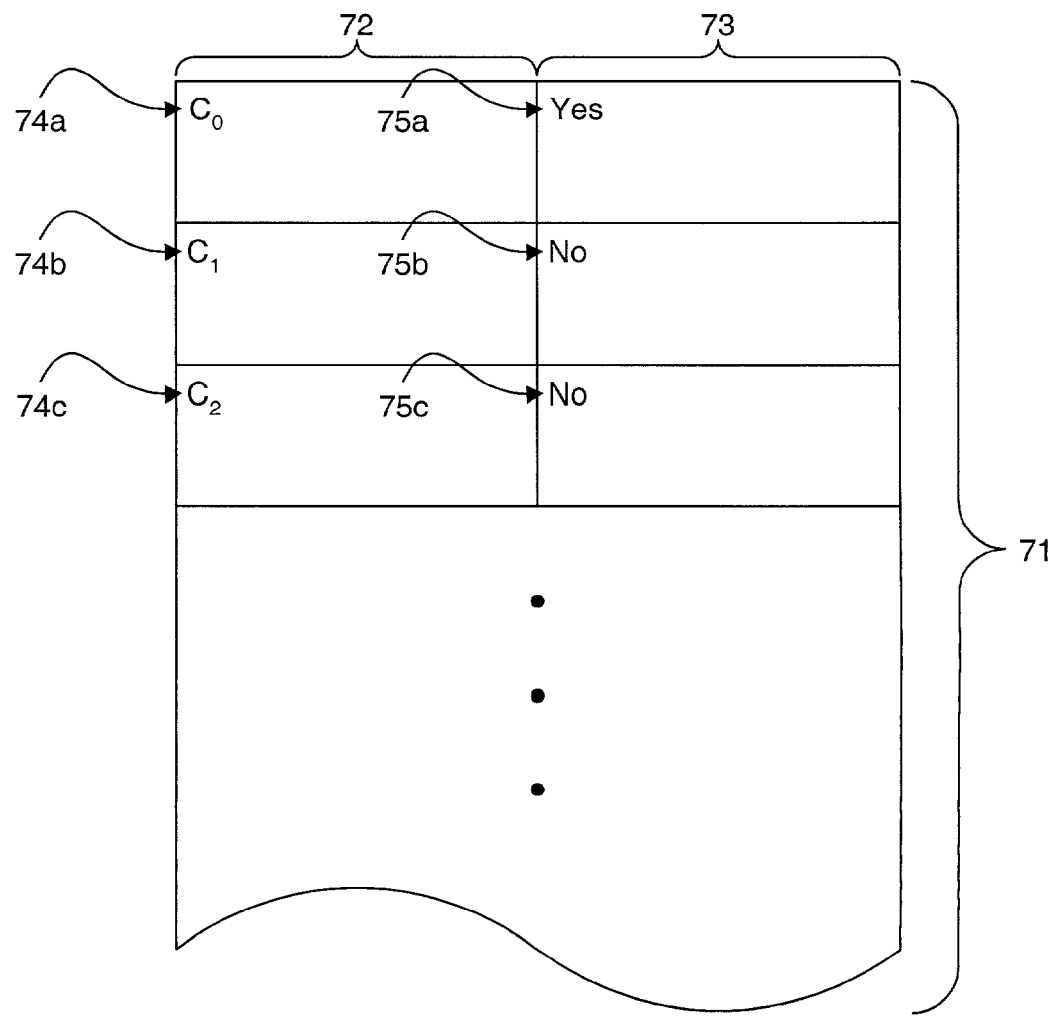
FIG. 4 is a data structure diagram showing a checksum table used by the antivirus system of FIG. 1.

FIG. 4 is a data structure diagram 70 showing a checksum table 71 used by the antivirus system 21 of FIG. 1. The checksum table 71 consists of a set of records, each including a checksum field 72 and infection marker field 73. The checksum field 72 stores a checksum 74a–c and the infection marker field 73 stores an indicator 75a–c of whether the message body or attachment corresponding to the checksum 74a–c is infected. The SMTP receiver 31 (shown in FIG. 2) calculates a new checksum 40 for each message body and attachment as each message 38 is received and the antivirus scanner 32 can efficiently compare each new checksum 40 against the stored checksums 74a–c in the checksum table 71. A new record entry is created in the checksum table 71 for each new checksum 40 and, if a new message body or attachment is infected, an infection indication is generated.

In the described embodiment, the checksum table 71 is maintained as a binary tree with 1024 nodes. The antivirus scanner 32 includes a replacement module (not shown) that uses a least-recently-used replacement algorithm to maintain the most current message checksums in the checksum table 71, although other replacement algorithms could be used, as would be recognized by one skilled in the art. Each checksum is preferably 128–1024 bits long.

Figure 5:
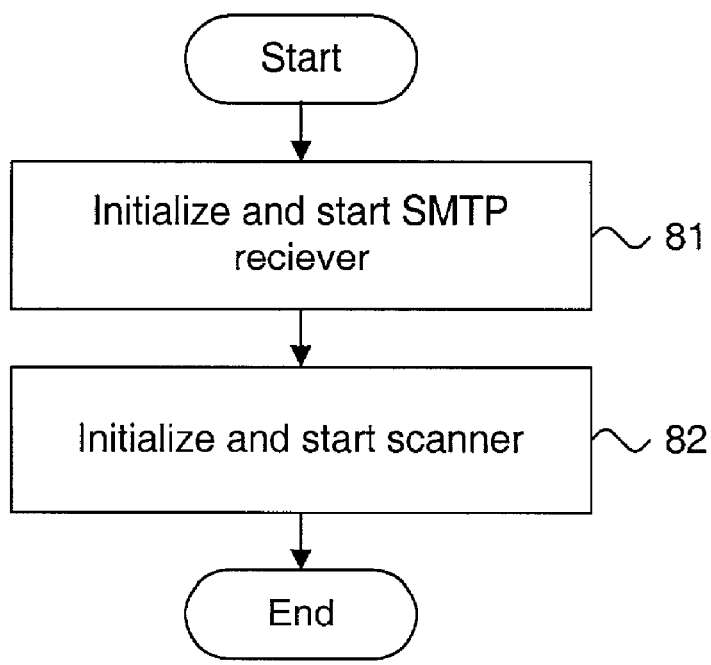
FIG. 5 is a flow diagram showing a method for performing efficient computer virus scanning of transient messages using checksums in a distributed computing environment, in accordance with the present invention.

FIG. 5 is a flow diagram showing a method 80 for performing efficient computer virus scanning of transient messages using checksums in a distributed computing environment, in accordance with the present invention. The SMTP receiver 31 and antivirus scanner 32 execute independently. Each of these components must be initialized and started (blocks 81–82) prior to performing antivirus screening and scanning. Upon respective initialization and starting, the SMTP receiver 31 and antivirus scanner 32 proceed independently, as further described below with reference to FIGS. 6 and 8, respectively.

Figure 6:
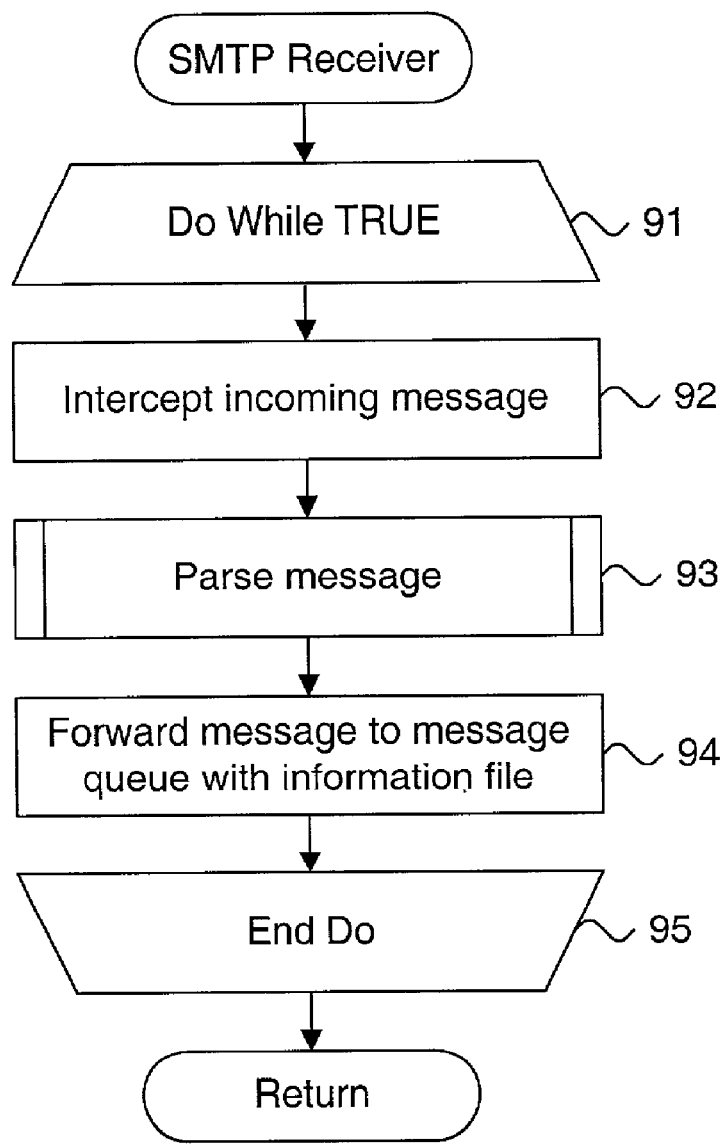
FIG. 6 is a flow diagram showing the routine for showing the process performed by the SMTP receiver of FIG. 2.

FIG. 6 is a flow diagram showing the process 90 performed by the SMTP receiver 31 of FIG. 2. The SMTP receiver 31 executes an iterative processing loop (blocks 91–95). During each iteration (block 91), an incoming message 51 is intercepted (block 92) at a network domain boundary. The message body 53 and any attachments 54, including embedded attachments, of the message 51 are parsed (block 93) to calculate running line-by-line checksums 40, as further described below with reference to FIG. 7. The message is then forwarded to the message queue 37 (block 94) for scanning by the antivirus scanner 32. Processing continues for each incoming message 51 (block 95), until the method ends or is terminated.

Figure 7:
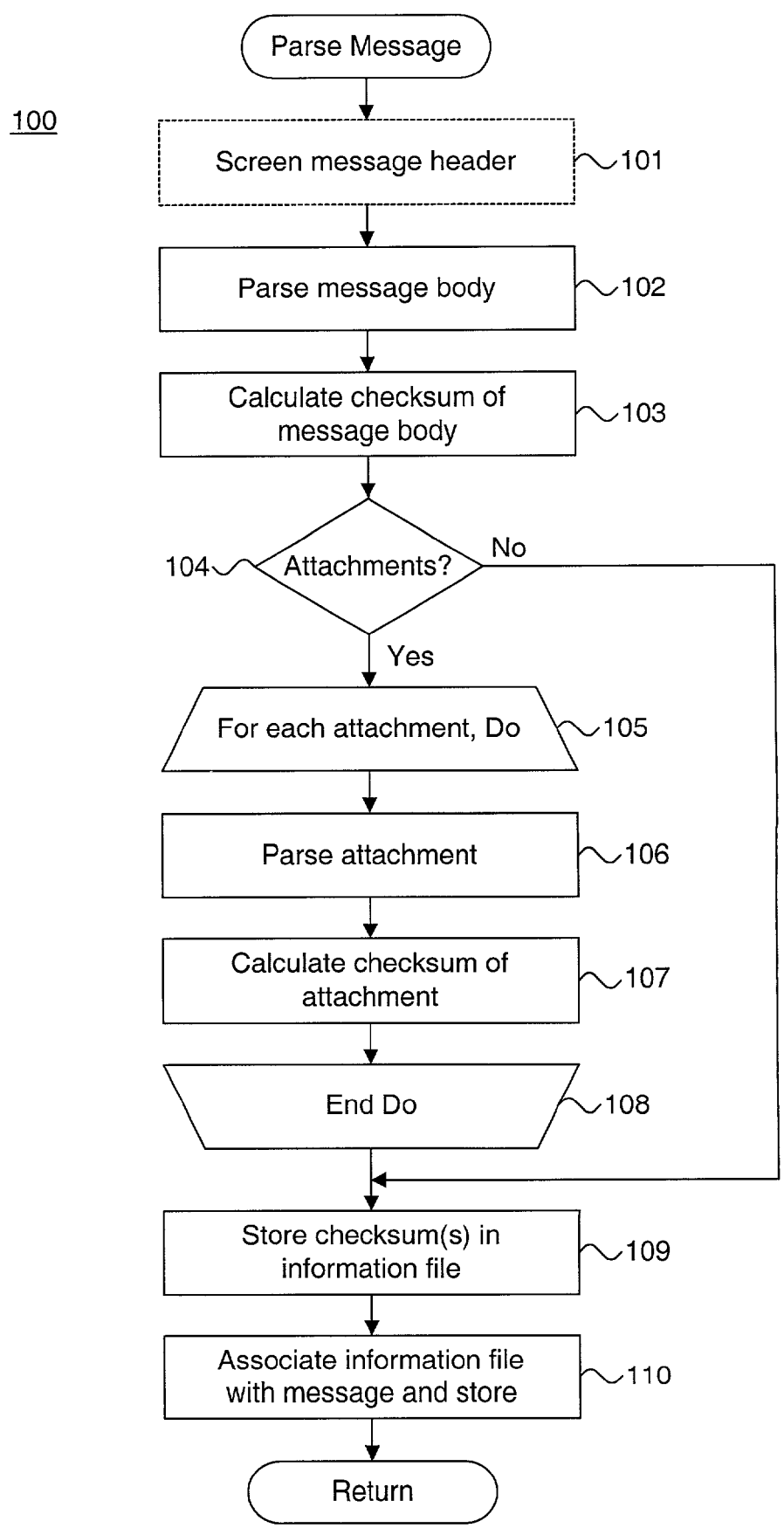
FIG. 7 is a flow diagram showing the routine for parsing a message for use in the method of FIG. 4.

FIG. 7 is a flow diagram showing the routine 100 for parsing a message for use in the method of FIG. 4. The purpose of this routine is to calculate a line-by-line checksum 40 (shown in FIG. 2) of the body 53 and any attachments 54 of an incoming message 51.

Preliminarily, in a further embodiment, the message header 52 of the incoming message 51 is screened for indications that the accompanying contents of the message contain a virus, malware or other form of bad content (block 101). The message body 53 is parsed from the incoming message 51 (block 102) and a running line-by-line checksum 40 is calculated (block 103), such as in accordance with the pseudocode of Example 1, above.

If the incoming message 51 includes attachments (block 104), each attachment 54, including any embedded attachments, is iteratively processed (blocks 105–108), as follows. For each attachment (block 105), the attachment 54 is parsed from the incoming message 51 (block 106) and a running line-by-line checksum 40 is calculated (block 107), such as in accordance with the pseudocode of Example 1, above. Processing continues for each attachment (block 108).

Each checksum 40 is stored in an information file 39 (block 109), which is then associated with the incoming message 51 and stored in the message queue (block 110). The routine then returns.

Figure 8:
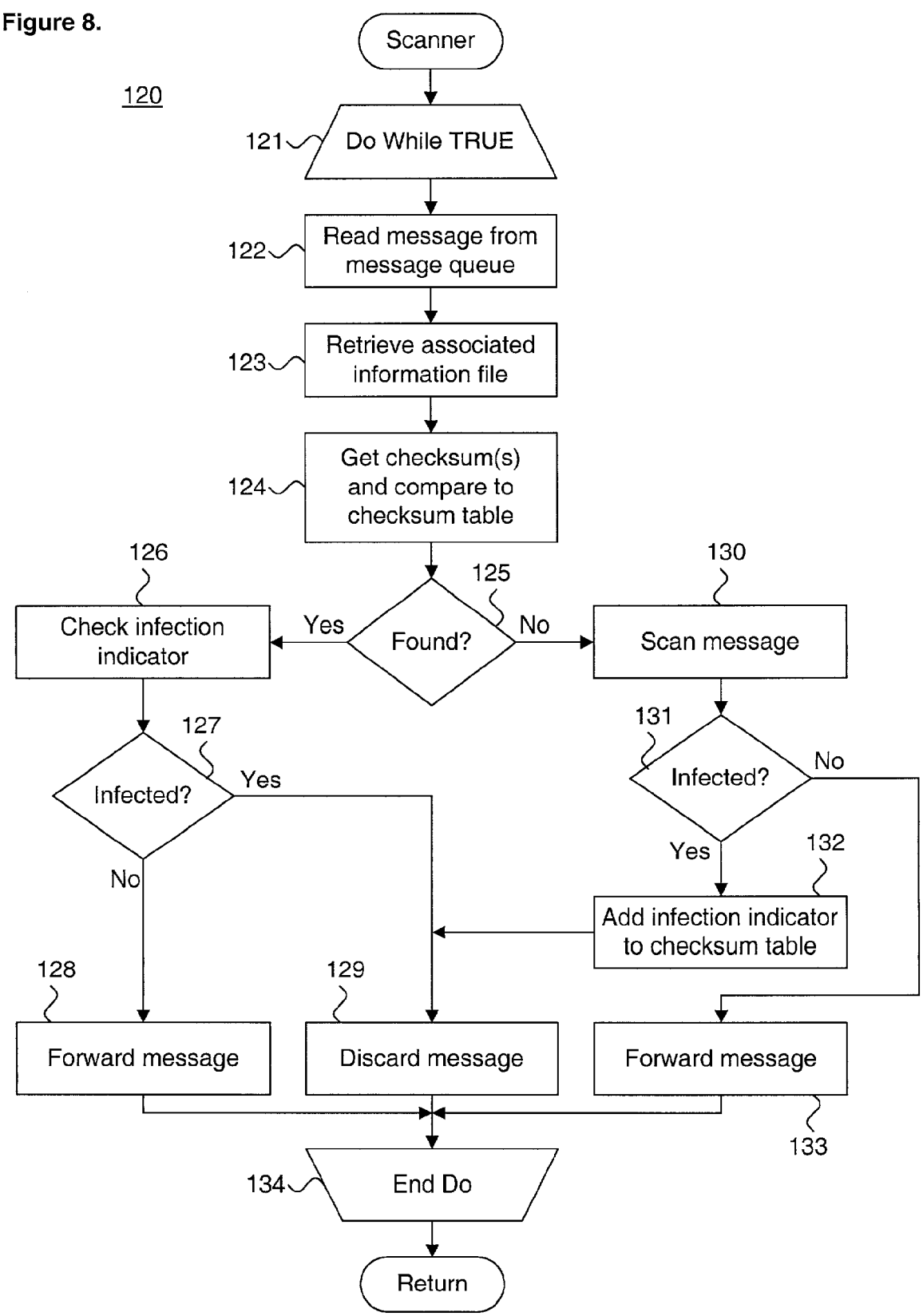
FIG. 8 is a flow diagram showing the process performed by the antivirus scanner of FIG. 2.

FIG. 8 is a flow diagram showing the process 120 performed by the antivirus scanner 32 of FIG. 2. The antivirus scanner 32 executes an iterative processing loop (blocks 121–134). During each iteration (block 121), a screened message 38 is read (block 122) and the associated information file 39 is retrieved (block 123) from the message queue 37. The checksums 40 are retrieved from the information file 39 and compared to the checksums 74a–c in the checksum table 41 (block 124). If a retrieved checksum 40 is found in the checksum table 41 (block 125), the corresponding infection indicators 75a–c are checked (block 126). If the screened message 38 is clean (block 127), the screened message 38 is forwarded (block 128), generally to the recipient client in the bounded network domain. Otherwise, if infected (block 127), the screened message 38 is discarded (block 129).

If no checksum matches (block 125), the screened message 38 is scanned for viruses, malware and other bad content (block 130). If the message is infected (block 131), an infection indicator 75a–c is added to the checksum record containing the checksum 74a–c corresponding to the infected body or attachment (block 132) and the message is discarded (block 129). If the message is clean (block 131), the message is forwarded (block 133). Processing continues for each screened message 38 (block 134), until the method ends or is terminated.

To ensure earliest rejection of any screened messages 38 potentially containing a virus, malware or other form of bad content, the antivirus scanner 32 discards any screened message 38 as soon as checksum 40 is matched, thereby avoiding scanning the entire message. Accordingly, saturation of the message queue 37 is avoided.

While the invention has been particularly shown and described as referenced to the embodiments thereof, those skilled in the art will understand that the foregoing and other changes in form and detail may be made therein without departing from the spirit and scope of the invention.

What is claimed is:

1. A computer implemented system for performing efficient computer virus scanning of transient messages using checksums in a distributed computing environment, comprising:
   an antivirus system intercepting an incoming message at a network domain boundary, the incoming message including a body storing message content;
   a parser module parsing the message content from the body and calculating a checksum over the parsed message content;
   a checksum module storing the checksum in an information file associated with the incoming message in a transient message store;
   an antivirus scanner scanning the incoming message for a presence of at least one of a computer virus and malware to identify infected message contents, and recording the checksum corresponding to each infected message content and an infection indicator;
   wherein the checksum is calculated as a running checksum on a line-by-line basis as the incoming message is received.

2. A system according to claim 1, further comprising:
   a message queue enqueueing each incoming message and the associated information file.

3. A system according to claim 1, further comprising:
   a table of entries, each comprising the checksum and the infection indicator corresponding to each infected message content.

4. A system according to claim 3, further comprising:
   a comparison module comparing the checksum to the entries in the table prior to scanning operations, and discarding the incoming message if the checksum of the incoming message matches the checksum of one such entry with one such infection indicator.

5. A system according to claim 3, further comprising:
   a replacement module replacing entries in the table using a least-recently-used replacement algorithm.

6. A system according to claim 3, wherein the table is structured as a binary tree.

7. A system according to claim 1, wherein the message content further comprises at least one of an attachment and an embedded attachment.

8. A system according to claim 1, wherein the distributed computing environment is TCP/IP-compliant and each incoming message is SMTP-compliant.

9. A computer implemented method for performing efficient computer virus scanning of transient messages using checksums in a distributed computing environment, comprising:
   intercepting an incoming message at a network domain boundary, the incoming message including a body storing message content;
   parsing the message content from the body and calculating a checksum over the parsed message content;
   calculating the checksum as a running checksum on a line-by-line basis as the incoming message is received;
   storing the checksum in an information file associated with the incoming message in a transient message store;
   scanning the incoming message for a presence of at least one of a computer virus and malware to identify infected message contents; and
   recording the checksum corresponding to each infected message content and an infection indicator.

10. A method according to claim 9, further comprising:
    enqueueing each incoming message and the associated information file onto a message queue.

11. A method according to claim 9, further comprising:
    maintaining a table of entries, each comprising the checksum and the infection indicator corresponding to each infected message content.

12. A method according to claim 11, further comprising:
    comparing the checksum to the entries in the table prior to scanning operations; and
    discarding the incoming message if the checksum of the incoming message matches the checksum of one such entry with one such infection indicator.

13. A method according to claim 11, further comprising:
    replacing entries in the table using a least-recently-used replacement algorithm.

14. A method according to claim 11, further comprising:
    structuring the table as a binary tree.

15. A method according to claim 9, wherein the message content further comprises at least one of an attachment and an embedded attachment.

16. A method according to claim 9, wherein the distributed computing environment is TCP/IP-compliant and each incoming message is SMTP-compliant.

17. A computer-readable storage medium holding code for performing the method according to claim 9, 10, 11, 12, 13, 14, 15, or 16.

18. A computer implemented system for performing efficient computer virus scanning of transient messages with message digests, comprising:
    an antivirus system intercepting an incoming message at a network domain boundary, the incoming message including a header including fields, which each store field values, and a body storing message content;
    a parser module parsing the field values from each field in the header and the message content from the body;
    a digest module generating a message digest over each such field value and over the message content and recording the message digests corresponding to the incoming message;
    an antivirus scanner scanning the incoming message for a presence of at least one of a computer virus and malware to identify infected message contents;
    an update module updating the message digest corresponding to each infected message content with an infection indicator; and a set of digests, each comprising the message digest and the infection indicator corresponding to each infected message content.

19. A system according to claim 18, further comprising:
a message queue enqueueing each incoming message.

20. A system according to claim 18, further comprising:
a comparison module comparing the message digest to the entries in the table prior to scanning operations, and discarding the incoming message if the message digest of the incoming message matches the message digest of one such entry with one such infection indicator.

21. A system according to claim 18, wherein the message content further comprises at least one of an attachment and an embedded attachment.

22. A system according to claim 18, wherein the message digest comprises at least one of SHA-1 and MD5 encryption.

23. A system according to claim 18, wherein the bounded network domain is TCP/IP-compliant and each such message packet is SMTP-compliant.

24. A computer implemented method for performing efficient computer virus scanning of transient messages with message digests, comprising:
intercepting an incoming message at a network domain boundary, the incoming message including a header including fields, which each store field values, and a body storing message content;
parsing the field values from each field in the header and the message content from the body and generating a message digest over each such field value and over the message content;
recording the message digests corresponding to the incoming message;
scanning the incoming message for a presence of at least one of a computer virus and malware to identify infected message contents;
updating the message digest corresponding to each infected message content with an infection indicator; and
maintaining a set of digests, each comprising the message digest and the infection indicator corresponding to each infected message content.

25. A method according to claim 24, further comprising:
enqueueing each incoming message onto a message queue.

26. A method according to claim 24, further comprising:
comparing the message digest to the entries in the table prior to scanning operations; and
discarding the incoming message if the message digest of the incoming message matches the message digest of one such entry with one such infection indicator.

27. A method according to claim 24, wherein the message content further comprises at least one of an attachment and an embedded attachment.

28. A method according to claim 24, wherein the message digest comprises at least one of SHA-1 and MD5 encryption.

29. A method according to claim 24, wherein the bounded network domain is TCP/IP-compliant and each such message packet is SMTP-compliant.

30. A computer-readable storage medium holding code for performing the method according to claim 24, 25, 26, 27, 28, or 29.

31. A computer implemented system for providing dynamic computer virus and malware protection of message packets in a bounded network domain, comprising:
an antivirus system intercepting an incoming message packet, each incoming message packet comprising a plurality of sections comprising a header storing field values and a body storing message packet content, and providing dynamic computer virus and malware protection, comprising at least one of:
a checksum module calculating and storing a checksum over the message packet content stored in the body of the incoming message packet; and
a digest module generating and storing a digest over at least one the field values stored in the header and the message packet content stored in the body of the incoming message packet;
an antivirus scanner scanning the incoming message packet if the at least one of the checksum and the digest have not been previously stored with an infection indicator indicating a presence of at least one of a computer virus and malware;
wherein the checksum is calculated as a running checksum on a line-by-line basis as the incoming message packet is received.

32. A system according to claim 31, wherein the incoming message packet is discarded if the at least one of the checksum and the digest has been previously stored with an infection indicator indicating a presence of at least one of a computer virus and malware.

33. A system according to claim 31, wherein the distributed computing environment is TCP/IP-compliant and each message packet is SMTP-compliant.

34. A computer implemented method for providing dynamic computer virus and malware protection of message packets in a bounded network domain, comprising:
intercepting an incoming message packet, each incoming message packet comprising a plurality of sections comprising a header storing field values and a body storing message packet content;
providing dynamic computer virus and malware protection, comprising at least one of:
calculating a checksum over the message packet content stored in the body of the incoming message packet; and
generating a digest over at least one the field values stored in the header and the message packet content stored in the body of the incoming message packet;
storing at least one of the checksum and the digest; and
scanning the incoming message packet if the at least one of the checksum and the digest have not been previously stored with an infection indicator indicating a presence of at least one of a computer virus and malware;
wherein the checksum is calculated as a running checksum on a line-by-line basis as the incoming message packet is received.

35. A method according to claim 34, further comprising:
discarding the incoming message packet if the at least one of the checksum and the digest has been previously stored with an infection indicator indicating a presence of at least one of a computer virus and malware.

36. A method according to claim 34, wherein the distributed computing environment is TCP/IP-compliant and each message packet is SMTP-compliant.

37. A computer-readable storage medium holding code for performing the method according to claim 34, 35, or 36.

38. A system according to claim 4, wherein the incoming message is not scanned by the antivirus scanner if the checksum of the incoming message matches the checksum of one such entry with one such infection identifier.

39. A system according to claim 18, wherein the field values include a subject value.

40. A system according to claim 18, wherein the message content only includes scripted portions in an Hypertext Markup Language (HTML) incoming message.

* * * * *